United States Patent [19]

Schalz

[11] Patent Number: 5,793,526

[45] Date of Patent: Aug. 11, 1998

[54] GEAR UNIT FOR FOCUSING MICROSCOPES

[75] Inventor: Karl-Josef Schalz, Weilburg, Germany

[73] Assignee: Leica Mikroskopie und Systeme GmbH, Wetzlar, Germany

[21] Appl. No.: 690,622

[22] Filed: Jul. 31, 1996

[30] Foreign Application Priority Data

Jul. 31, 1995 [DE] Germany ............ 195 28 041.5

[51] Int. Cl.⁶ ............ G02B 21/26; F16H 35/18
[52] U.S. Cl. ............ 359/392; 359/383; 74/10.52; 74/425
[58] Field of Search ............ 359/368, 383, 359/321–394; 74/10.45, 10.52, 10.8, 479.01, 89.14

[56] References Cited

U.S. PATENT DOCUMENTS

| 3,683,704 | 8/1972 | Kuroha ............ 359/392 |
| 4,090,069 | 5/1978 | Lisfeld et al. ............ 250/231.14 |
| 4,331,039 | 5/1982 | Ruge ............ 74/10.8 |
| 4,575,199 | 3/1986 | Lisfeld ............ 359/392 |
| 4,616,517 | 10/1986 | Esmay ............ 74/10.45 |
| 4,919,001 | 4/1990 | Ogiwara et al. ............ 359/392 |
| 5,365,801 | 11/1994 | Nakamura ............ 359/392 |

FOREIGN PATENT DOCUMENTS

| 890 281 | 2/1944 | France . |
| 1 825 959 | 2/1961 | Germany . |
| 26 27 486 | 12/1977 | Germany . |
| 26 48 484 | 2/1981 | Germany . |
| 32 15 566 | 6/1989 | Germany . |
| 35 28 343 | 5/1994 | Germany . |

*Primary Examiner*—Thong Nguyen
*Attorney, Agent, or Firm*—Foley & Lardner

[57] ABSTRACT

A gear unit (1) for focusing microscopes and having coarse adjustment, fine adjustment and extra-fine adjustment is described, in which, for the purpose of focusing, the object stage (5) is moved via a toothed gear (6). Coaxially arranged control knobs (7, 8) are provided on the microscope as manual control elements. The control knobs (7, 8) are connected via a drive shaft (9) and the gear unit (1) to a toothed rack (10) of the object stage. The control knob (7) for fine adjustment is provided on a rotation shaft (11) arranged so as to be capable of longitudinal displacement. Arranged on this rotation shaft (11) are at least two gear wheels (12, 13) of different diameter for fine adjustment and extra-fine adjustment. One of the gear wheels (12, 13) is connected to the gear unit (1) via the longitudinal displacement of the rotation axis (11).

12 Claims, 2 Drawing Sheets

GEAR UNIT FOR FOCUSING MICROSCOPES

The invention relates to a focusing drive mechanism for the object Stage of a microscope.

BACKGROUND OF THE INVENTION

1. Field of the Invention

In microscopes, focusing is performed by moving the object Stage, which is moved via a mechanical gear unit along the optical axis of the microscope objective. The gear unit is constructed on a shaft extending within the body of the microscope and a plurality of gear wheels, the two ends of the shaft respectively having two coaxially arranged and rotatably mounted control knobs. One of the two control knobs is provided for quick coarse focusing adjustment and the other is provided for fine focusing adjustment and connected via the gear unit to the shaft extending within.

2. Description of Related Art

Such a coarse and fine adjustment drive for microscopes is disclosed in DE 26 27 486 A1. In addition to the two manual adjusting knobs with a planetary gear drive, provision is made here for an additional motorized fine focus control which acts via a lever on the coarse adjustment drive of the planetary gear drive.

A further focusing drive for the microscope stage is disclosed in DE 32 15 566 C2. In addition to the control knobs, which are to be operated manually and are arranged coaxially, an additional motorized focusing drive is likewise provided, which acts directly on the microscope stage via a drive shaft and a cam.

A drive mechanism for the X-Y positioning of a microscope coordinate stage is described in DE 35 28 343 C2. The drive, which is to be operated manually, has a friction brake for the coordinate stage. The friction brake permits low-friction coarse positioning and adjustable friction braking for the fine positioning of the stage.

DE 26 48 484 C3 discloses a coarse and fine adjustment drive which is to be operated manually and in which a further control knob is provided for extra-fine adjustment. In this solution, therefore, three adjusting knobs for manual focusing are arranged coaxially and connected via a gear unit and a toothed rack to the object stage of a microscope. However, it has emerged that it was thereby necessary to select a design which was unaccustomedly large for the operator, resulting in impairment of the ability to focus.

However, the need remains in conventional microscopes to gear down the conventional fine focusing adjustment of the microscope, thereby, in addition to fine adjustment, further having extra-fine adjustment available.

SUMMARY OF THE INVENTION

It is therefore the object of the present invention to design a manual height adjustment for the object stage of a microscope with extra-fine adjustment in such a way that the design of the control knobs is retained and, nevertheless, the customary manipulation of the focusing adjustment drive is ensured.

As a result of the invention, it is achieved that the customary coaxially arranged control knobs also continue to be present on both sides of the microscope stand in the ergonomically favorable overall size, and that switching over from fine adjustment to the gear ratio for extra-fine adjustment is performed when necessary simply by pushing in the rotation shaft.

BRIEF DESCRIPTION OF THE DRAWINGS

The invention is explained in more detail with reference to exemplary embodiments with the aid of the diagrammatic drawing, in which.

DESCRIPTION OF THE PREFERRED EMBODIMENTS

Figure 1:
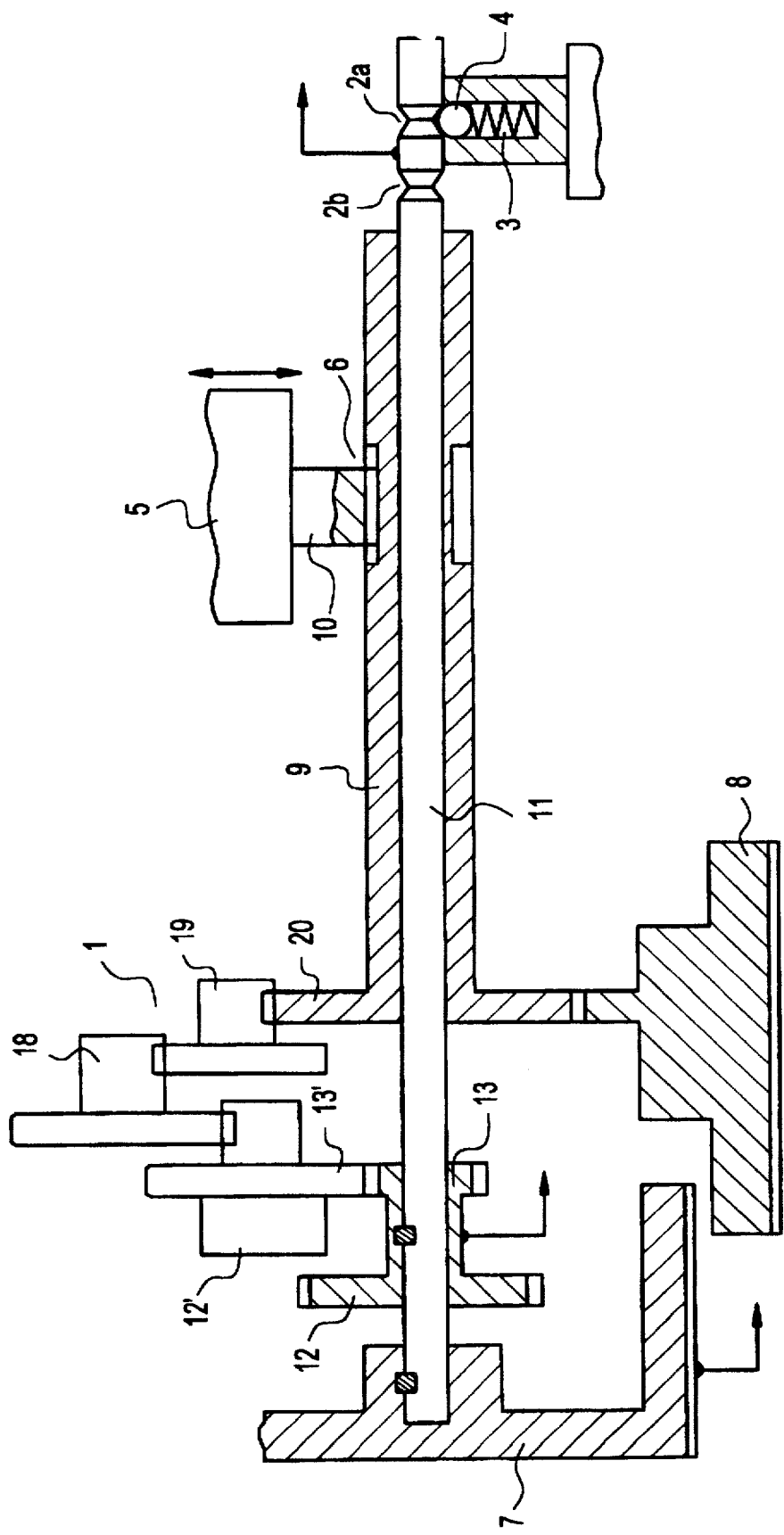
FIG. 1 shows a section through the gear unit of the focusing drive having two gear wheels for the fine adjustment and extra-fine adjustment.

FIG. 1 shows a section through the gear unit 1 for focusing a microscope (not represented). The focusing is performed by moving the object stage 5, which is moved on the optical axis (double arrow) of the microscope objective via a geared connection. The gear unit 1 has a drive shaft 9, which extends within the body of the microscope and has a hollow interior. The object stage 5 is connected to the drive shaft 9 via a toothed rack 10 and a toothed gear 6. Provided on the drive shaft 9 at one end is a permanently arranged gear wheel 20 which is connected to the control knob 8 for coarse adjustment. The rotary movement at the control knob 8 is transmitted to the object stage 5 via the gear wheel 20, the drive shaft 9, the toothed gear 6 and the toothed rack 10.

The fine adjustment has a rotation shaft 11 which is designed to be capable of displacement in the direction of the single arrows and which is rotatably mounted in the drive shaft 9. Provided at one end of the rotation shaft 11 are two grooves 2a and 2b which, together with a ball latch permanently arranged on the microscope and comprising a ball 4 and spring 3, ensure a defined longitudinal position of the rotation shaft 11 during displacement.

The control knob 7 for fine adjustment is permanently arranged at the other end of the rotation shaft 11. The rotary movement of the control knob 7 and the rotation shaft 11 is transmitted to the gear wheel 20 of the drive shaft 9 via a gear unit comprising the gear wheels 13, 13', 18 and 19. In the position shown here, the control knob 7 provides extra-fine adjustment, due to the smaller diameter of the gear wheel 13 engaging the larger diameter of the corresponding gear wheel 13'.

In order to switch over to fine adjustment, the rotation shaft 11 is displaced in the direction of the single arrows via the control knob 7, the ball 4 latching into the groove 2b. In this process, the gear wheel 12 is also brought into engagement with the gear wheel 12', the connection between the gear wheels 13 and 13' being undone. Fine adjustment is achieved in this switchover by means of the larger diameter of the gear wheel 12 engaging the smaller diameter of the gear wheel 12'.

By pulling on the control knob 7, or by pushing in the control knob (not represented) arranged at the other end of the rotation shaft 11, it is possible again to switch over to extra-fine adjustment.

It goes without saying that the invention is not limited to the switchover from fine adjustment to extra-fine adjustment, but additional step-up or step-down ratios can be achieved for the drive by means of arranging further pairs of gear wheels. It would be advantageous in this case if the rotation shaft were fitted with further grooves for the purpose of defined switchover to the further transmission ratios.

Figure 2:
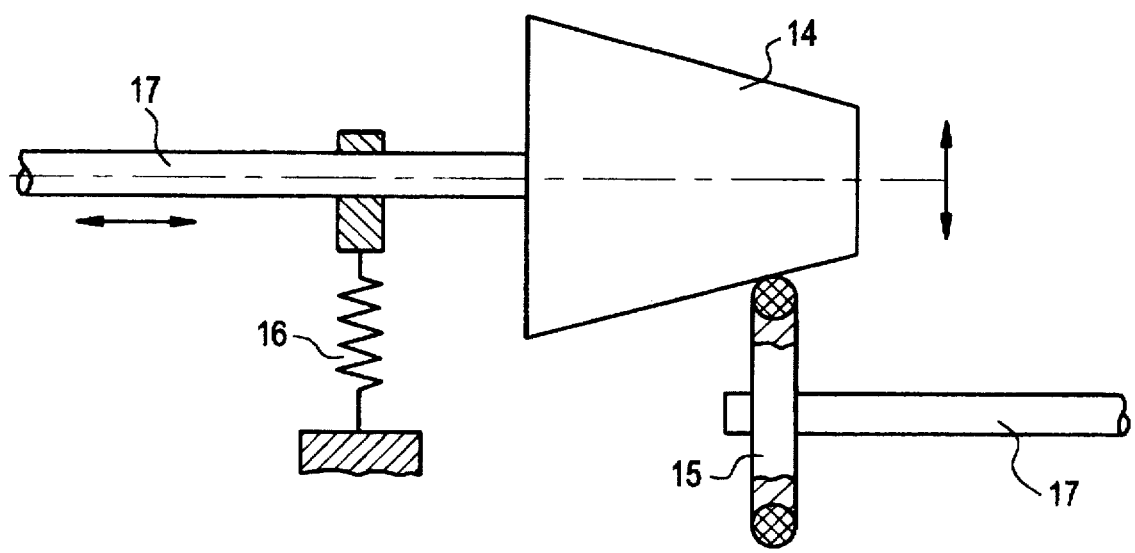
FIG. 2 shows a variant of the gear unit having a bevel gear and a friction wheel.

In the exemplary embodiment of FIG. 2, a friction wheel 15 is provided on the rotation shaft 11 instead of the two gear wheels 12, 13. The friction wheel 15 is biased by spring 16 into a force-closed connection with a bevel gear 14 which is arranged on an additional axis 17 such that it can be displaced in the two directions of the double arrow. In this exemplary embodiment, the bevel gear 14 replaces the two gear wheels 12' and 13'. By means of contiguous engagement between a bevel gear 14 and a friction wheel 15, it is possible to set the fine adjustment or extra-fine adjustment at any desired transmission ratio limited only by the relative circumferences of the bevel gear 14 and the friction wheel 15. Of course, it is possible in this arrangement to provide a plurality of grooves on the shaft 11 for the purpose of setting various defined transmission ratios.

I claim:

1. Focusing drive mechanism for an object stage of a microscope having a multistage drive including a gear unit and coaxially arranged control knobs for coarse, fine and extra-fine adjustment, the control knobs rotating a drive shaft having a gear wheel engaging a toothed rack for displacing the object stage, wherein:

the control knob for fine adjustment is permanently connected to a rotation shaft which is displaceable in a longitudinal direction for permitting switching over between fine adjustment and extra-fine adjustment, and gear wheels of different diameters fixed on the rotation shaft are concurrently displaced longitudinally and individually brought into engagement with the gear unit for switching over between fine adjustment and extra-fine adjustment.

2. Focusing drive mechanism according to claim 1, wherein the drive shaft comprises a tube and guides in its interior the rotation shaft for fine adjustment and extra-fine adjustment.

3. Focusing drive mechanism according to claim 2, wherein the rotation shaft has grooves which are spaced apart from one another in the longitudinal direction and extend in the circumferential direction, and into which a ball under spring tension engages thereby defining respectively associated latches for fine adjustment and extra-fine adjustment.

4. Focusing drive mechanism according to claim 1, wherein the rotation shaft has grooves which are spaced apart from one another in the longitudinal direction and extend in the circumferential direction, and into which a ball under spring tension engages thereby defining respectively associated latches for fine adjustment and extra-fine adjustment.

5. Focusing drive mechanism for the object stage of a microscope having a multistage drive including a gear unit and coaxially arranged control knobs for coarse, fine and extra-fine adjustment, the control knobs rotating a drive shaft having a gear wheel engaging a toothed rack for displacing the object stage, wherein:

the control knob for fine adjustment is permanently connected to a rotation shaft which is displaceable in a longitudinal direction, for permitting switching over between fine adjustment and extra-fine adjustment, and a friction wheel fixed on the rotation shaft is concurrently displaced longitudinally in contiguous engagement with a bevel gear driving the drive shaft, providing a continuously variable transmission ratio between fine adjustment and extra-fine adjustment.

6. Focusing drive mechanism according to claim 5, wherein the drive shaft comprises a tube and guides in its interior the rotation shaft for fine adjustment and extra-fine adjustment.

7. Focusing drive mechanism according to claim 6, wherein the rotation shaft has grooves which are spaced apart from one another in the longitudinal direction and extend in the circumferential direction, and into which a ball under spring tension engages thereby defining respectively associated latches for fine adjustment and extra-fine adjustment.

8. Focusing drive mechanism according to claim 5, wherein the rotation shaft has grooves which are spaced apart from one another in the longitudinal direction and extend in the circumferential direction, and into which a ball under spring tension engages thereby defining respectively associated latches for fine adjustment and extra-fine adjustment.

9. A focusing drive mechanism for positioning an object stage, the focusing drive mechanism comprising:

a rotatable drive shaft for turning a movement thereby displacing the object stage;

a first control knob being fixed on and rotating with said drive shaft for coarse displacement of the object stage;

a second control knob being fixed on a rotation shaft, said second control knob and said rotation shaft being displaceable along their axis of rotation between a first position and a second position; and a gear unit for rotationally connecting said rotation shaft to said drive shaft, said gear unit providing a first gear ratio for fine displacement of the object stage and a second gear ratio for extra-fine displacement of the object stage;

wherein said first gear ratio is selected at said first position and said second gear ratio is selected at said second position.

10. The focusing drive according to claim 9, wherein said gear unit comprises a first gear train providing said first gear ratio and a second gear train providing said second gear ratio, said first gear train is engaged and said second gear train is disengaged in said first position, and said first gear train is disengaged and said second gear train is engaged in said second position.

11. The focusing drive according to claim 9, wherein said gear unit comprises a friction wheel in contiguous rolling engagement with a frustum of a bevel gear, said first gear ratio corresponds to contiguous rolling engagement of said friction wheel with a first frustum circumference, and said second gear ratio corresponds to contiguous rolling engagement with a second frustum circumference.

12. The focusing drive according to claim 11, wherein said gear unit provides an infinitely variable gear ratio between said first gear ratio and said second gear ratio.

* * * * *